Sept. 3, 1963  W. C. WOOTTON  3,102,572
LOCK NUT EMPLOYING A RESILIENT LOCKING RING
Filed Sept. 26, 1960
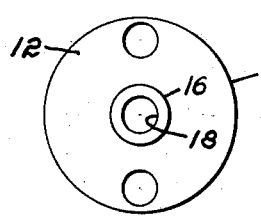
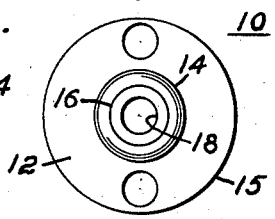
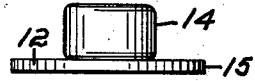
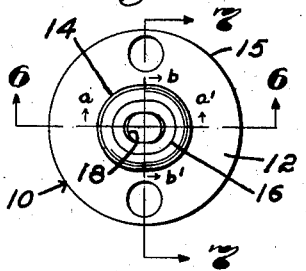
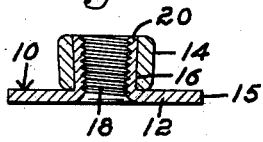
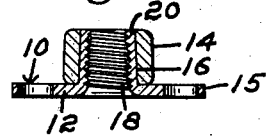
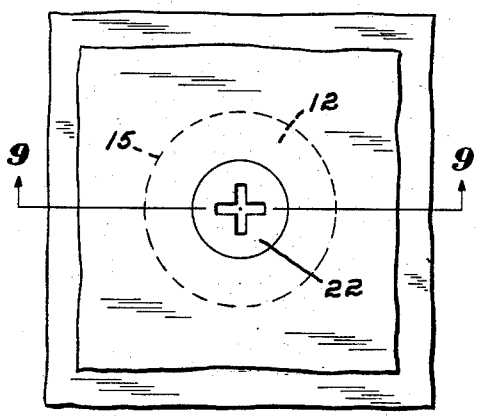
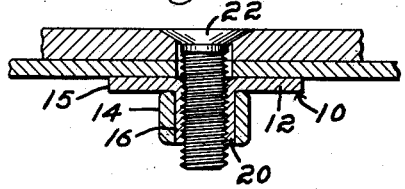
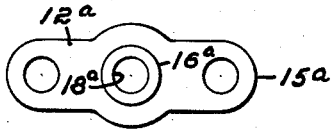
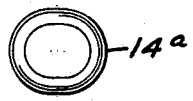
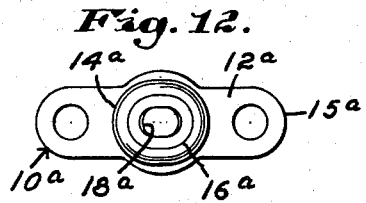
Inventor:
William C. Wootton,
by James B. Tiffany Jr. Atty.

2,102,572
Patented Sept. 3, 1963

3,102,572
LOCK NUT EMPLOYING A RESILIENT LOCKING RING
William C. Wootton, Fremont, Calif., assignor to United-Carr Fastener Corporation, Cambridge, Mass., a corporation of Delaware
Filed Sept. 26, 1960, Ser. No. 58,382
1 Claim. (Cl. 151—21)

This invention relates generally to fastening devices and specifically to a self-locking nut member.

Various forms of self-locking nuts are in use in industry, most of which have an indefinite torque life and which, after an indeterminate range of cycling, lose their torque completely. Furthermore, existing nuts which have the self-locking feature are limited to materials used in their construction and it has been virtually impossible to manufacture self-locking nuts for specific purposes utilizing brass or aluminum.

The object of this invention, therefore, is to provide a self-locking nut which may be constructed from a combination of high-temperature alloys.

A further object of this invention is to provide a self-locking nut with high temperature properties, good corrosion resistance, low magnetic permeability and long torque life.

Other objects of the invention will, in part, be obvious, and will, in part, appear hereinafter.

In the drawings:

FIG. 1 is a top plan view of one member of the fastening device prior to assembly of the locking member;

FIG. 2 is a top plan view of the locking ring member;

FIG. 3 is a top plan view of the fastener with the locking ring assembled therewith;

FIG. 4 is a view in side elevation of the assembly of FIG. 3;

FIG. 5 is a top plan view of the assembly utilizing an oval locking ring;

FIG. 6 is a view in section taken on line 6—6 of FIG. 5;

FIG. 7 is a view in section taken on line 7—7 of FIG. 5;

FIG. 8 is a top plan view of the fastener assembled with a pair of supporting plates;

FIG. 9 is a view in section taken on line 9—9 of FIG. 8;

FIG. 10 is a top plan view of a modified of the fastener prior to the assembly of the locking ring;

FIG. 11 is a top plan view of a modified form of the oval locking ring member; and FIG. 12 is a top plan view of the modified fastener member having the oval locking ring assembled therewith.

Referring to the drawings, there is illustrated a nut assembled 10 comprising a nut member 12 and a locking ring 14. The nut member 12 has a flange 15 extending radially from one end and a barrel portion 16 extending substantially normal thereto, having internal threads 18 extending throughout its length. The locking ring member 14 comprises the other member of this two part fastener and is adapted for telescopic intimate engagement with the entire length of the barrel portion 16. The barrel portion 16 of the nut member has a relative thin imperforated wall 20 and one of the materials which I have found to be advantageously employed in this construction is type 302 stainless steel which is not heat treatable and which may be tapped with relative ease. The ring member 14 which is adapted for insertion over the nut barrel may be formed of a type A286 stainless steel which is heat treatable to a suitable hardness range to give it spring characteristics whereby it would return to its original shape when deformed by the entry and withdrawal of the bolt. The locking ring has an inside diameter closely approximating the outside diameter of the nut barrel providing for a press fit over the barrel 14.

For certain purposes as illustrated in FIGS. 1 through 4, the locking ring 14 having a circular form may be inserted over the barrel member 16 having a press fit and after assembly deformed to an elliptical shape as illustrated in FIG. 5 presenting major $a$—$a'$ and minor $b$—$b'$ axes. Distorting the locking ring would, of course, distort the nut barrel inside to a similar shape. At this point the nut member and locking ring is heat treated to obtain spring temper in the locking ring. The nut itself being of mild steel is not hardenable so that its shape thereafter would be controlled by the hardened lock ring. However, as shown in FIGS. 10 through 12, if the nut member 12a were constructed of materials such as aluminum or brass where the heat could be detrimental to the nut, the locking ring 14a is formed in an elliptical shape and hardened prior to assembly. The elliptical ring would then be pressed on the barrel 16a causing it to assume a similar elliptical shape.

It will be seen by referring to FIG. 6 that the area of the wall section 20 adjacent the flange 15 is relatively more rigid than the free end of the barrel portion 16 providing for unlocked threads at the base to permit easy torque-free entry for the screw or bolt 22.

Also, by referring to FIG. 6, the walls 20 of the nut member 10 are inclined outwardly due to a greater distortion of the upper portion of the barrel 16 with respect to the relative rigidity of this portion adjacent the flange 15. The physical characteristics of this type of an assembly tend to lock the ring member 14 in permanent engagement with the barrel 16.

As illustrated in FIG. 9, the bolt 22 may be started into the nut assembly 10, the pressure exerted on the threads 18 of the barrel member 16 will tend to cause the barrel to return to its circular form but will be opposed by the spring characteristics of the locking ring 14 which will result in the development of considerable locking torque.

Since certain other obvious modifications may be made in this device without departing the scope of the invention, it is intended that all matter contained herein be interpreted in an illustrative and not in a limiting sense.

I claim:

A self-locking preassembled nut member including an imperforate, thin walled, internally threaded, originally cylindrical barrel portion of relatively soft material integrally connected to and extending normal to a radially extending flange base portion provided with means for attachment to a work piece, said barrel having a circumferentially smooth external surface, the radial thickness of said wall as measured between the root of said internal threads and said external surface, being substantially constant at all points throughout the length of said barrel, and a hardened, circumferentially continuous, tubularly flexible, oval-shaped locking member having a height substantially equal to the axial height of said barrel member, said locking member having smooth internal and external peripheral surfaces and a radial thickness as defined by said internal and external surfaces which is substantially constant throughout its axial length and forceably assembled with a press fit on the barrel, said external surface of said barrel portion and said internal surface of said tubular locking member being in peripheral face-to-face engaging relationship throughout the axial length of both said barrel and said locking member in said assembled condition whereby said barrel member is normally distorted to present major and minor axes thereby providing locking engagement with a bolt threaded therethrough by the pressure exerted by the threads of said barrel portion occasioned during the threading of said bolt into said barrel in opposition to the spring characteristics of said locking ring.

References Cited in the file of this patent

UNITED STATES PATENTS

| | | |
|---|---|---|
| 1,151,632 | Wall | Aug. 31, 1915 |
| 2,385,991 | Huntoon | Oct. 2, 1945 |
| 2,406,070 | Funk | Aug. 20, 1946 |

FOREIGN PATENTS

| | | |
|---|---|---|
| 1,018,391 | France | Jan. 7, 1953 |
| 518,654 | Canada | Nov. 22, 1955 |